UNITED STATES PATENT OFFICE.

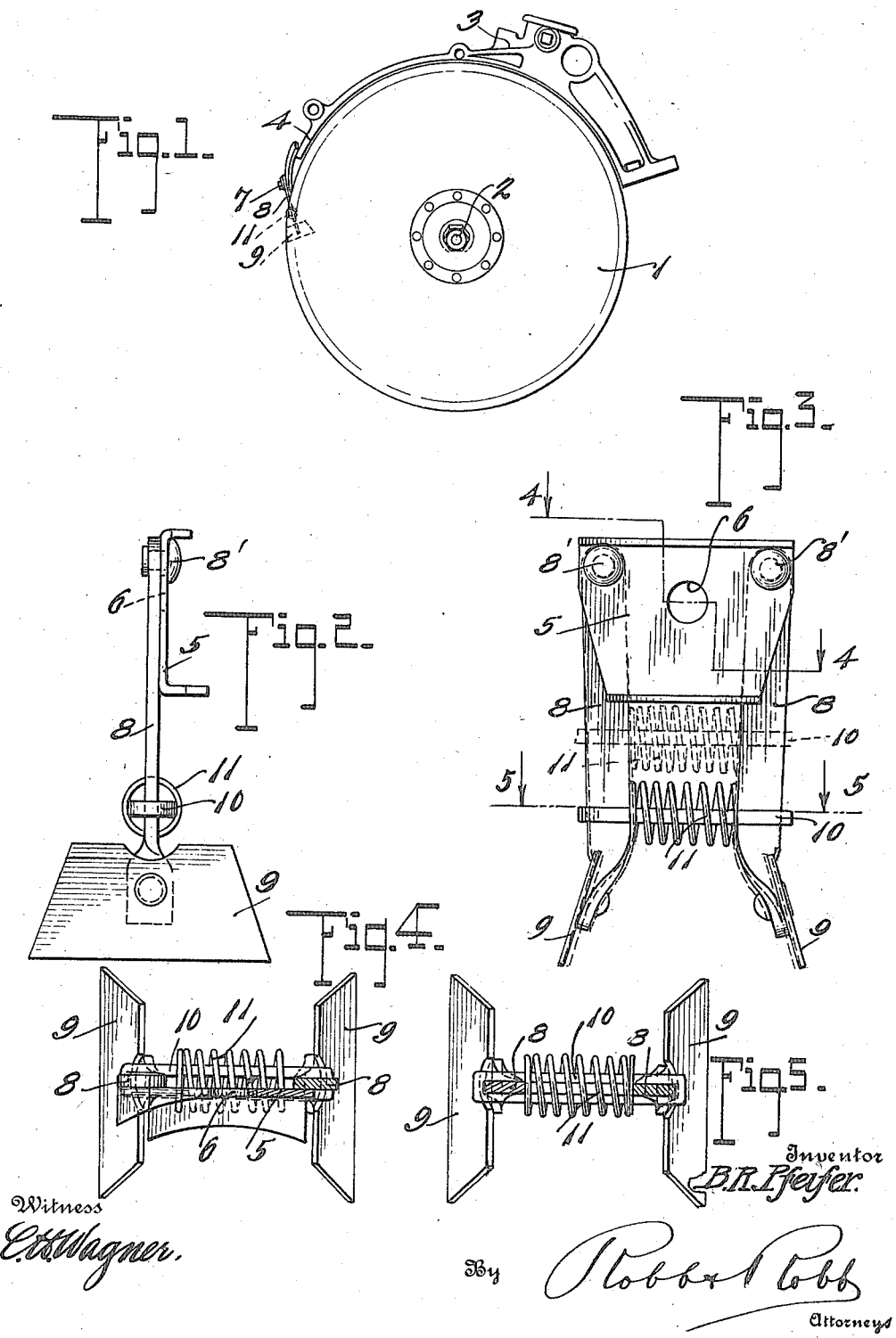

BERNARD R. PFEIFER, OF JESSIE, NORTH DAKOTA.

SCRAPER FOR GRAIN-DRILLS.

1,264,970.  Specification of Letters Patent.  Patented May 7, 1918.

Application filed May 21, 1917. Serial No. 170,000.

*To all whom it may concern:*

Be it known that I, BERNARD R. PFEIFER, a citizen of the United States, residing at Jessie, in the county of Griggs and State of North Dakota, have invented certain new and useful Improvements in Scrapers for Grain-Drills, of which the following is a specification.

The present invention has to do with an attachment designed for agricultural implements, embodying double disk furrow openers, such as grain drills, and it has for its object to provide means disposed between the disks for preventing clogging or adherence of the soil to said disks.

The primary feature of this invention is the provision of a scraper of this character, which is double in form, the elements of which are to mounted and connected as to permit of relative movement and adjustment with respect to the associated disks, such adjustment including an adjustment of the tension of the scraper members.

Referring to the drawings:

Figure 1 is a side elevation of the disk portion of a grain drill showing the application of this invention, Fig. 2 is a side elevation of the attachment, Fig. 3 is a bottom plan view thereof, and, Figs. 4 and 5 are transverse sectional views taken about on the lines 4—4 and 5—5 respectively of Fig. 3.

Throughout the following detail description and on the several figures of the drawings, similar parts are referred to by like reference characters.

Referring to the drawings, 1 designates a disk or furrow opener suitably mounted upon the axis 2, there generally being provided in grain drills embodying such disks an arrangement of the disks in pairs. The reference 3 designates the casting of the grain spout, and the lower extremity of the rearwardly extending arm 4 of this casting is designed to carry the attachment which forms the subject matter of this invention.

The attachment embodies a supporting plate 5 of suitable form having an opening 6 therein to receive a bolt 7, for connecting the attachment to the support 4 hereinbefore referred to. Pivotally connected at each side of the plate 5 is a scraper element 8, each of these being provided at their free extremity with a scraper blade 9. This blade may be given any desired shape for coöperation with a contiguous disk, and is controlled by means now to be set forth.

Encircling the shank portions of these scraper members is a retaining member or ring 10, said ring being adjustable toward or from the supporting plate 5, or the pivots 8' of the scraper members, which pivots are spaced apart a slightly greater distance than is represented by the size of the ring 10. It will be obvious from this arrangement, that the sliding of the ring toward the support will tend to draw the scraper members toward each other, and movement in the opposite direction will allow them to separate, the purpose of such adjustment being to control or regulate the disposition of the blades 9 with respect to their coöperating disks. Intermediate the shanks 8 of the scraper members is disposed an extension spring 11, which tends to press the scraper members apart and cause the same to exert such pressure against the disk as controlled by the adjustment of the retaining ring 10 in the manner above specified. It will be apparent that as the ring 10 is moved toward the pivots of the scraper members, the spring which encircles the ring is carried therewith, and there is a reduction of pressure of the spring against the scraper members incident to such disposition, as well as a reduction in resistance to compression offered by the spring. On the other hand, as the adjusting means is moved toward the blades, or away from the pivots, the blades are allowed to assume a closer relation with respect to the disks by the separation of the scraper members, and at the same time, there is an increase in the resistance offered to movement of the member due to shortening of the leverage from the blade edge, or point of pressure and the spring or fulcrum point. In other words, the nearer the spring is to the outer ends of the scraper members, the greater the resistance that is offered to a compression of the spring 11.

The free movement of the scraper members on their support is not interfered with by adjusting means, and this is desirable because of the character of the implements which requires the disks to shift according to the unevenness of the surface over which they move.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, what I claim as new is:

1. A device of the class described, comprising a support, a pair of scraper members, means pivotally connecting said members to the support, and means adjustable on the scraper members for regulating the scraping action.

2. A device of the class described, comprising a support, a pair of scraper members pivotally connected thereto, and regulating means mounted on the scraper members for movement toward or from the pivots to adjust their relation with respect to the objects to be scraped, including pressure means.

3. A device of the class described, comprising a support, a pair of scraper members pivotally connected thereto, means encircling said members to limit their separating movement, and pressure means intermediate said members tending to separate the same while permitting yielding thereof toward each other.

4. A device of the class described, comprising a support, a pair of scraper members pivotally connected thereto, means encircling said members and adjustable thereon for regulating their disposition with respect to the objects to be scraped, and pressure means carried by the encircling means tending to press the scraper members away from each other.

5. A device of the class described, comprising a support, a pair of scraper members movably mounted on said support, a retaining member mounted on said scraper members for movement toward or from the support, and tension means operable with the retaining member to thereby adjust the tension exerted on the scraper members.

6. A scraper attachment for agricultural implements, comprising a plate and means for connecting said plate to said implements, a pair of scraper elements pivotally connected to said plate, a retaining ring encircling said elements and adjustable therealong, and a spring arranged intermediate the scraper members for pressing said members away from each other.

7. A scraper attachment for agricultural implements, comprising a plate and means for connecting said plate to said implements, a pair of scraper elements pivotally connected to said plate, a retaining ring encircling said elements and adjustable therealong, and a spring arranged intermediate the scraper members and encircling the retaining ring aforesaid, said ring and spring being movable toward or from the plate aforesaid to effect adjustment of the tension on said scraper members.

In testimony whereof I affix my signature.

BERNARD R. PFEIFER.

Copies of this patent may be obtained for five cents each, by addressing the "Commissioner of Patents, Washington, D. C."